March 9, 1965 K. MAINEY 3,172,491
WEIGHING APPARATUS
Filed Aug. 12, 1963 3 Sheets-Sheet 1
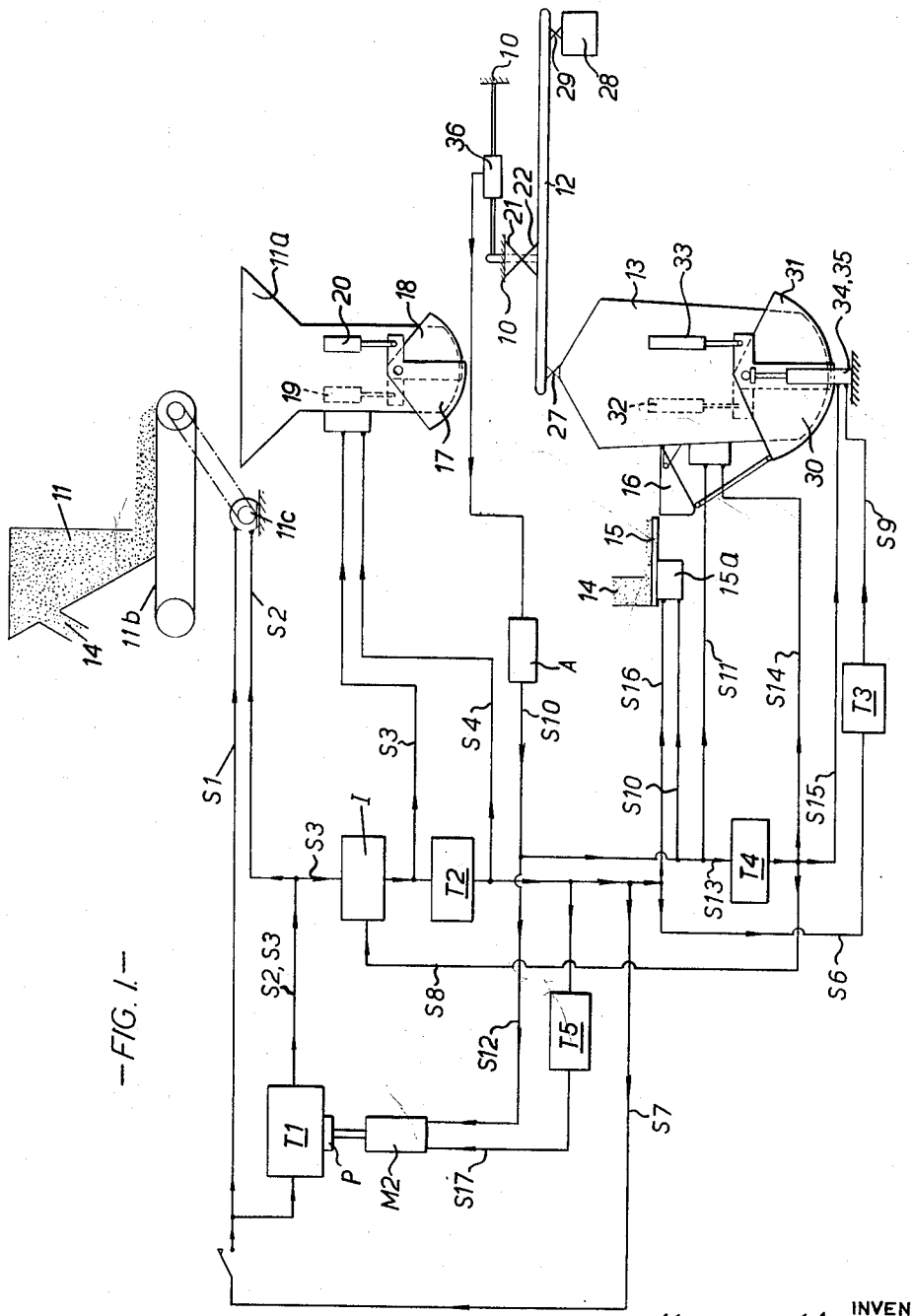
—FIG. 1.—
INVENTOR:
KENNETH MAINEY
BY March 9, 1965  K. MAINEY  3,172,491
WEIGHING APPARATUS
Filed Aug. 12, 1963  3 Sheets-Sheet 2
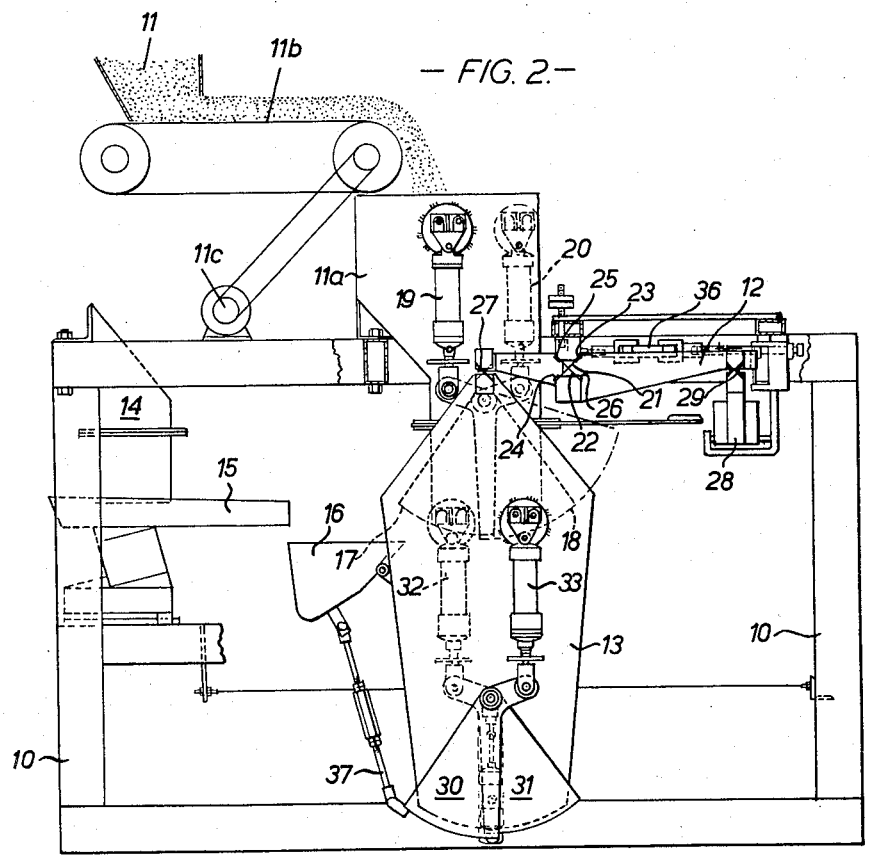
INVENTOR:
KENNETH MAINEY
BY March 9, 1965 K. MAINEY 3,172,491
WEIGHING APPARATUS
Filed Aug. 12, 1963 3 Sheets-Sheet 3
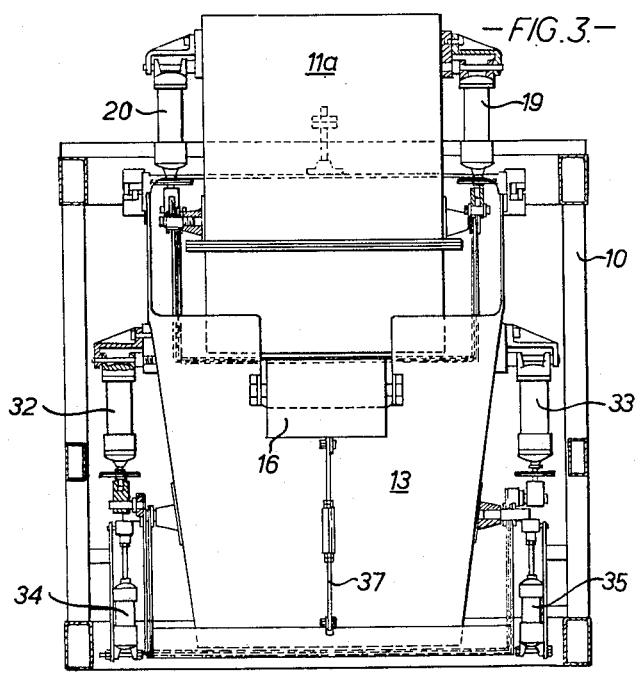
INVENTOR:
KENNETH MAINEY
BY United States Patent Office 3,172,491
Patented Mar. 9, 1965

3,172,491
WEIGHING APPARATUS
Kenneth Mainey, Maghull, England, assignor to J. Bibby & Sons Limited, Lancashire, England, a British company
Filed Aug. 12, 1963, Ser. No. 301,574
Claims priority, application Great Britain, Sept. 15, 1962, 35,249/62
6 Claims. (Cl. 177—120)

This invention is for improvements in or relating to weighing apparatus and is more particularly, although not necessarily exclusively, concerned with improvements in or modifications of the apparatus described in the specification of my application for patent No. 301,573.

Briefly, in that specification there is described a weighing apparatus comprising a weigh-beam or the like, a load pan or hopper on or suspended from said weigh-beam, a load-sensitive device operatively associated with the weigh-beam and adapted to produce an electric signal in accordance with the load thereon, means for feeding material in bulk into said load pan or hopper and means for feeding or dribbling load make-up material into said pan or hopper, or into an auxiliary hopper or pan associated therewith, said load make-up means being controlled by said electric signal so that the feed of load make-up material is terminated when the correct or substantially correct weight of material is available for delivery.

For speed of output of, for example, bags filled with a correct weight of material, it is important that the time the dribble feed is in operation should be as short as possible. An object of the present invention is to provide an arrangement for automatically making adjustments to the system as and when required (e.g. when there is a variation in the density or flowability of the material being weighed) so as to achieve this.

According to the present invention there is provided a weighing apparatus operatively associated with a load-sensitive device adapted to provide an electric signal, in accordance with the load on the apparatus, for terminating loading of the apparatus, wherein a time difference between the signal which terminates the loading of the apparatus and a reference signal adjusts the loading period.

According to a further feature of the invention there is provided a weighing apparatus operatively associated with a load-sensitive device adapted, when subjected by the load to a predetermined stress, to provide an electric signal for terminating loading of the apparatus wherein a time difference between the signal which terminates the loading of the apparatus and a reference signal is used to adjust the loading period.

One particular embodiment of the invention, as applied to an apparatus for filling bags (e.g. 56 lbs. bags) with weighed amounts of material, will now be described, by way of example, the weighing apparatus in this particular case being constructed as described in the specification of our application for patent No. 301,573. In the following description reference is made to the accompanying drawing wherein:

FIGURE 1 is a diagrammatic representation of the apparatus and its control system, FIGURE 2 is a side elevation of the weighing apparatus, and FIGURE 3 is a front elevation.

The apparatus shown on the drawing comprises a frame 10 which supports, at its upper part, a hopper 11 for the material to be weighed and delivered into the bags.

The machine also comprises a weigh-beam 12 from one arm of which there is suspended a weighing hopper or pan 13.

The hopper 11 is formed with a chute 14 by which weight make-up material is fed to a jogging frame or dribble feeder 15 and thereby into a weight make-up pan 16 which delivers it, as hereinafter described, into the weighing hopper or pan 13.

The delivery of the main bulk of material to be weighed from the hopper 11 into a storage chamber (11a) is time controlled by the starting and stopping of a belt conveyor (11b). The weight of material fed into the storage chamber (11a) depends on the time the belt conveyor (11b) runs and is under, but as near as possible to the exact weight required.

The delivery of the main bulk of material to be weighed from the storage chamber (11a) into the weigh pan or hopper 13 is controlled by the opening and closing of a pair of shutters 17 and 18 operated by pneumatic piston and cylinder devices 19 and 20. The said doors remain open for a time sufficient to allow all the material stored in the storage chamber to fall into the weigh pan or hopper 13.

The weigh beam 12 is supported from the frame of the machine by crossed flexible springs 21 and 22 located one behind the other (as viewed in FIGURE 2), the spring 21 being attached to the machine frame at 23 and to the weigh-beam at 24 whilst the spring 22 is attached to the machine frame at 25 and to the weigh-beam at 26.

A similar crossed flexible spring arrangement 27 is provided for suspending the weigh pan 13 from the weigh-beam.

The weigh-beam counterbalance weight 28 is also suspended from the weigh-beam by a crossed flexible leaf-spring arrangement 29.

The lower open end of the weighing pan or hopper 13 is provided with a pair of arcuate doors or shutters 30 and 31 which are operated by pneumatic piston and cylinder devices 32 and 33, the doors being opened when a weighing operation has been completed so as to discharge the contents of the pan 13, via a chute located below it, into the bag to be filled.

The weight of the pan 13 and its contents, except during the final stage in the weighing operation, is supported by pneumatic piston and cylinder or dashpot devices 34 and 35. This avoids shock and unnecessary strain on the actual weighing mechanism.

This weighing mechanism includes, in addition to the weigh-beam 12 and its associated parts, a load cell 36 having its member, the electrical resistance of which changes when it is subjected to a stress, connected between the stationary frame of the apparatus and the weigh-beam 12 so that it will be subjected to tension when the weigh-beam moves during the final stage of a weighing operation.

The jogging frame or dribble feeder 15 is actuated by an electric motor the stopping of which is effected, through appropriate contactor or control gear 15a, under the control of the load cell 36. It will be noted that the pan 16, is, to all intents and purposes, part of the weighing pan or hopper 13 so that the material in the pan 16 adds its weight to the material in the pan 13. When the correct weight has been achieved the doors 30 and 31 are opened, as previously described, and the movement of the door 30 through a connecting rod 37 tilts the pan 16 so that the weight-make-up material therein is tipped into the hopper 13.

Appropriate inter-connected timing devices are provided for ensuring that the various mechanisms (i.e. the belt conveyor), the doors 17 and 18, pneumatic cylinder 34 and 35, starting of the motor driving the dribble feeder 15, and doors 30 and 31 operate in sequence and automatically at the appropriate times.

These timing devices and the mode of operation of the apparatus above is described as follows:

At the commencement of the first weighing operation a signal is sent, via $S_1$, to start the belt conveyor ($11b$) and at the same time an electronic delay timer $T_1$ is triggered. At the termination of this delay a signal is sent, via $S_2$, to stop the belt conveyor. Thus, near the required correct weight of material is delivered into the storage chamber ($11a$). A signal also passes, via $S_3$, through an interlock I, opens the storage chamber shutters 17 and 18, so that the near correct weight of material is delivered into the weighing hopper 13, and triggers another delay timer $T_2$. At the termination of this delay a signal is sent, via $S_4$, to close the storage chamber shutters 17 and 18, the reference timer $T_5$ is triggered via $S_5$, the delay timer $T_3$ is triggered via $S_6$, and the dribble feed supply is started by a signal via $S_{16}$. A further signal from the delay timer $T_2$ is sent back via $S_7$, through the starting switch to restart the belt conveyor and trigger the electronic delay timer $T_1$.

As before, at the end of this delay period the belt conveyor is stopped, but the signal to open the storage chamber shutters 17 and 18 is locked in the interlock I until it is freed by an incoming signal, via $S_8$, to the interlock I from another part of the circuit as is explained later.

At the termination of the delay period $T_3$, the pneumatic devices 34 and 35 are operated by a signal via $S_9$ to allow the weigh-beam 12 to take the weight of the hopper 13 and its contents, the weigh-beam slowly moving up to its horizontal position under the control of its counterweight 28, the load cell 36 during this time being inoperative. For example, if the desired weight is 56 lbs., the beam is arranged to be horizontal at 50 lbs. and the load cell then comes into operation and measures the final 6 lbs. through a 5 to 1 beam ratio applying 30 lbs. to the load cell. This provides better sensitivity. As material is fed into the weight-make-up pan 16, by the dribble feeder 15, the total weight of material suspended from the weigh scale increases and through the weigh-beam acts on the load cell 36 until, at the correct or substantially correct weight (i.e. the weight of material in the pan 13 plus the weight of material in the pan 16) dribbling or jogging of material into the pan 16 ceases due to the load cell sending a signal, via amplifier A and $S_{10}$, to stop the dribble feed 15. This same signal, via $S_{11}$, opens the weigh pan doors 30 and 31, via $S_{12}$ drives a directional motor $M_2$ clockwise (or stops the directional motor being driven anti-clockwise, as explained later) and, via $S_{13}$, triggers delay timer $T_4$. At the termination of this delay period $T_4$ a signal is sent, via $S_{14}$, to close the weigh pan doors 30 and 31 and a signal is sent, via $S_{15}$, to make the cylinders 34 and 35 operative again to take the weight of the pan and its load. A further signal from the delay timer $T_4$ is sent to the electronic store interlock I via $S_8$. Providing the belt conveyor ($11b$) has finished delivering the main bulk of material into the storage chamber then the signal from the electronic timer $T_1$ is released and the cycle of operation is repeated. If the signal from the electronic delay timer $T_1$ reaches the interlock after the signal from the delay timer $T_4$ it passes through the interlock without any delay and the cycle of operation is repeated.

It will be appreciated that to improve the speed of output from the weighing machine, the time the dribble feed is in operation should be as short as possible. A system is incorporated within the main circuit to provide automatic adjustment to the electronic control timer $T_1$ as and when required (e.g. when there is a variation in the density of the material being weighed). As described earlier, the manner in which the bulk load is measured is by allowing the belt conveyor to convey a uniform stream of material into a storage chamber for a controlled length of time. A signal from the delay timer $T_2$, among other things, triggers via $S_5$ the reference timer $T_5$. The reference delay is adjusted to delay its outgoing signal to the directional (reversible) motor $M_2$ by a time equal to the time required to supply extra material, via the dribble feed, to make up an ideal bulk load weight to the desired final weight.

As above described the dribble feed motor is arranged to stop when the signal from the load cell L indicates that the desired final weight has been reached, and at the same time the load cell sends a signal via $S_{12}$ to the directional motor $M_2$.

The circuit of the directional motor $M_2$ is arranged so that if a signal, via $S_{17}$ from the reference delay timer arrives before the signal from the load cell, then the motor rotates anti-clockwise until the load cell signal arrives to stop it. Similarly, if the signal from the load cell arrives at the directional motor before the signal from the reference delay the motor is arranged to rotate clockwise until the reference delay signal arrives to stop it. If the bulk load is of ideal weight then the signals from the load cell and reference delay reach the directional motor simultaneously; in this case the motor remains stationary.

The volume of bulk material which is measured by the electronic delay timer is dependent on the density of the material. This means that a decrease in the density of the material results in a decrease in the weight of the bulk load. This decrease in the weight of the bulk load causes the dribble feed motor to be energised for a period longer than normal. At the termination of the reference delay the directional motor will be driven anti-clockwise until, when the final weight is reached, the load cell sends a signal to stop it.

The output shaft S from the directional motor $M_2$ is coupled to a variable potentiometer P in the electronic delay timer $T_1$. Adjustments to this potentiometer alter the magnitude of the delay period. The value of the variable potentiometer is chosen so that its rotation anti-clockwise adjusts the delay time to make the succeeding bulk load to be nearer to the ideal weight.

The compensating arrangement works in a similar manner to cope with increases in the density of the material except that in this case the motor $M_2$ rotates in the clockwise direction.

I claim:

1. An apparatus for delivering measured quantities of material by weight comprising a frame, a hopper for material to be weighed supported on said frame, a weigh beam, means pivotally supporting the weigh beam on the frame, a weigh pan on said weigh beam, means for feeding material in bulk at a predetermined rate from said hopper to said weigh pan, control means including timing devices operative at predetermined times to start and stop said feeding of material in bulk from the hopper to the weigh ban so that an approximately predetermined weight of material less that the correct weight is delivered periodically into the weigh pan, dribble means including a driving mechanism, for dribbling weight make-up material into the weigh pan and control means for said dribble means, which control means includes a timing device for starting dribbling of weight make-up material into the weigh pan at a predetermined time, weigh-beam sensitive means operatively associated with the weigh-beam so as to be operated when the correct weight of material has been delivered to the pan and send a signal to said driving mechanism of the dribble means to terminate said dribbling of weight-make-up material into the weigh pan, means for generating a reference signal and means responsive to time differences between the reference signal and said signal from the weigh-beam sensitive means and operative, in accordance with said time differences to adjust the means feeding the bulk material to the weigh pan so as to maintain the bulk weight close to but below the correct weight.

2. An apparatus for delivering measured quantities of material by weight comprising a frame, a hopper for material to be weighed supported on said frame, a weigh beam, means pivotally supporting the weigh-beam on the frame, a weigh pan on said weigh-beam, means for feeding material in bulk at a predetermined rate from said hopper to said weigh pan, control means including timing devices operative at predetermined times to start and stop said feeding of material in bulk from the hopper to the weigh pan so that an approximately predetermined weight of material less than the correct weight is delivered periodically into the weigh pan, dribble means including a driving mechanism, for dribbling weight make-up material into the weigh pan and control means for said dribble means, which control means includes a timing device for starting dribbling of weight make-up material into the weigh pan at a predetermined time, a load-cell operatively connected to the weigh beam so that it is subjected to the load on the weigh beam whereby, when the correct weight of material has been delivered to the pan, the load-cell sends a signal to said driving mechanism of the dribble means to terminate said dribbling of weight make-up material into the weigh pan, means for generating a reference signal and means responsive to time differences between the reference signal and said load-cell signal and operative in accordance with said time differences, to adjust the means feeding the bulk material to the weigh pan so as to maintain the bulk weight close to but below the correct weight.

3. An apparatus for delivering measured quantities of material by weight comprising a frame, a hopper for material to be weighed supported on said frame, a weigh-beam, means pivotally supporting the weigh-beam on the frame, a weigh pan on said weigh-beam, conveyor means including a motor for feeding material in bulk at a predetermined rate from said hopper to said weigh pan, control means for said motor including a delay timing device for starting the motor and a delay timing device for stopping the motor whereby the motor is caused to run for a predetermined time between the operation of the one delay timing device and the operation of the other to feed material in bulk from the hopper to the weigh pan so that an approximately predetermined weight of material less than the correct weight is delivered periodically into the weigh pan, a reversible motor for adjusting the delay period of the timing device which stops the motor, control means for said reversible motor, dribble means including a driving mechanism, for dribbling weight make-up material into the weigh pan and control means for said dribble means, which control means includes a timing device for starting dribbling of weight make-up material into the weigh pan at a predetermined time, a load-cell operatively connected to the weigh beam so that it is subjected to the load on the weigh beam whereby, when the correct weight of material has been delivered to the pan, the load-cell sends a signal to said driving mechanism of the dribble means to terminate said dribbling of weight make-up material into the weigh pan, a reference timer for generating a reference signal and means for applying said reference signal and said load-cell signal to the control means of the reversible motor whereby said reversible motor operates, during any time difference between the reference signal and the load-cell signal, to adjust the time delay device for stopping the conveyor motor and thereby the period of operation of the conveyor so as to maintain the bulk weight close but below the correct weight.

4. An apparatus as claimed in claim 3 wherein the timing device which stops the motor driving the conveyor includes a potentiometer which is operatively connected to the reversible motor for operation thereby.

5. An apparatus for delivering measured quantities of material by weight comprising a frame, a first hopper for material to be weighed supported on said frame, a second hopper also supported on said frame and having openable and closable door means, a weigh-beam, means pivotally supporting the weigh-beam on the frame, a weigh pan on said weigh-beam, conveyor means for feeding material in bulk at a predetermined rate from said first hopper to said second hopper, control means including timing devices operative at predetermined times to start and stop said conveyor means for the feeding of material in bulk from the first hopper to the second hopper so that an approximately predetremined bulk weight of material less than the correct weight is delivered periodically into the second hopper, control means operative when said bulk weight of material has been delivered into the second hopper to open the door means thereof for the delivery of said bulk weight of material into the weigh pan, dribble means including a driving mechanism, for dribbling weight make-up material into the weigh pan and control means for said dribble means, which control means includes a timing device for starting dribbling of weight make-up material into the weigh pan at a predetermined time, weigh-beam sensitive means operatively associated with the weigh-beam so as to be operated when the correct weight of material has been delivered to the pan and send a signal to said driving mechanism of the dribble means to terminate said dribbling of weight make-up material into the weigh pan, means for generating a reference signal and means responsive to time differences between the reference signal and said signal from the weigh-beam sensitive means and operative, in accordance with said time differences to adjust the means feeding the bulk material to the second hopper so as to maintain the bulk weight close to but below the correct weight.

6. An apparatus for delivering measured quantities of material by weight comprising a frame, a first hopper for material to be weighed supported on said frame, a second hopper also supported on said frame and having openable and closable door means, a weigh-beam, means pivotally supporting the weigh-beam on the frame, a weigh pan on said weigh-beam, conveyor means for feeding material in bulk at a predetermined rate from said first hopper to said second hopper, control means including timing devices operative at predetermined times to start and stop said conveyor means for the feeding of material in bulk from the first hopper to the second hopper so that an approximately predetermined weight of material less than the correct weight is delivered periodically into the second hopper, a control means operative when said bulk weight of material has been delivered into the second hopper to open the door means thereof for the delivery of said bulk weight of material into the weigh pan, dribble means including a driving mechanism, for dribbling weight make-up material into the weigh pan and control means for said dribble means, which control means includes a timing device for starting dribbling of weight make-up material into the weigh pan at a predetermined time, a load-cell operatively connected to the weigh-beam so that it is subjected to the load on the weigh-beam whereby, when the correct weight of material has been delivered to the pan, the load-cell sends a signal to said driving mechanism of the dribble means to terminate said dribbling of weight make-up material into the weigh pan, means for generating a reference signal and means responsive to time differences between the reference signal and said load-cell signal and operative, in accordance with said time differences, to adjust the means feeding the bulk material to the second hopper so as to maintain the bulk weight close to but below the correct weight.

References Cited by the Examiner
UNITED STATES PATENTS

| | | | |
|---|---|---|---|
| 1,598,128 | 8/26 | Gase | 177—122 |
| 1,981,697 | 11/34 | Hartmann | 177—81 |
| 2,763,457 | 9/56 | Gregory | 177—122 |
| 2,983,325 | 5/61 | Moody | 177—71 |
| 3,116,801 | 1/64 | Bauder et al. | 177—210 |

LEO SMILOW, *Primary Examiner.*